Nov. 10, 1936.  J. E. PADGETT  2,060,590
SHOCK ABSORBING MEANS
Filed May 31, 1933  2 Sheets-Sheet 1

INVENTOR:
JOSEPH E. PADGETT
Kwis Hudson & Kent
ATTORNEYS

Nov. 10, 1936.   J. E. PADGETT   2,060,590
SHOCK ABSORBING MEANS
Filed May 31, 1933   2 Sheets-Sheet 2
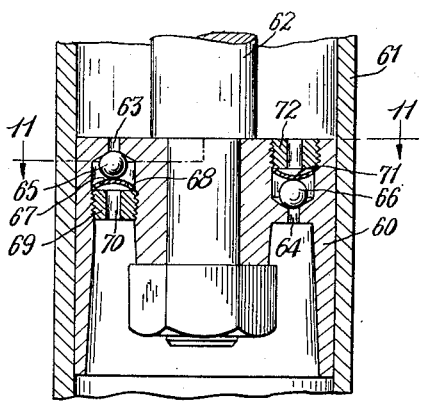
FIG. 8
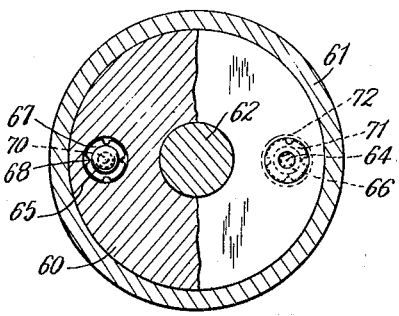
FIG. 11
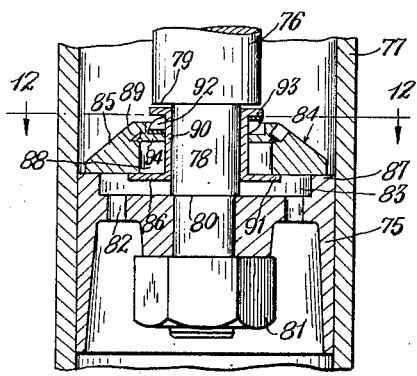
FIG. 9
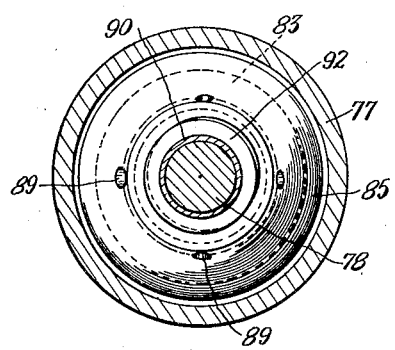
FIG. 12
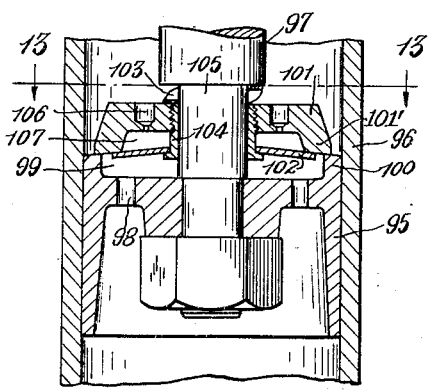
FIG. 10
FIG. 13
INVENTOR:
JOSEPH E. PADGETT
Kwis Hudson & Kent
ATTORNEYS Patented Nov. 10, 1936

2,060,590

UNITED STATES PATENT OFFICE 2,060,590

SHOCK ABSORBING MEANS

Joseph E. Padgett, Toledo, Ohio, assignor, by mesne assignments, to General Motors Corporation, Detroit, Mich., a corporation of Delaware Application May 31, 1933, Serial No. 673,587

11 Claims. (Cl. 188—88)

This invention relates to shock absorbing devices and, more particularly, to an improved form of shock absorber of the fluid-flow type.

An object of the present invention is to provide an improved shock absorber embodying novel fluid-flow control means.

Another object of this invention is to provide an improved shock absorber embodying fluid-flow control means such that the pressure value of the fluid is caused to build up in the device at a rate to effectively compensate for the relatively free action of that type of vehicle spring from which various frictional factors have been eliminated.

Still another object of the invention is to provide an improved fluid type shock absorber wherein the displacement of fluid is controlled by a valve structure composed of cooperating valve elements so arranged that upon a flow of fluid in one direction one valve element is movable relative to a second valve element while such second element remains seated and, upon a flow of fluid in the reverse direction, both elements are shiftable substantially as a unit by the fluid.

A further object of the invention is to provide an improved shock absorber having an opening through which fluid may be forced embodying flow control means for the opening which includes a valve element having an orifice therein and a second valve element cooperating with and movable relative to the first valve element such that the flow of fluid through the opening and the orifice is initially retarded and the subsequent flow of fluid through the opening is controlled by the orifice.

Yet another object of the invention is to provided improved flow control means for a shock absorber of the fluid type, wherein such flow control means includes a relatively rigid element having an orifice therein, and a second element cooperating with the rigid element so as to control the orifice and to initially retard the flow of fluid through the orifice.

It is also an object of this invention to provide an improved shock absorber of the fluid-flow type having a plurality of chambers and a connecting passage for forcing fluid from one chamber to the other, and wherein deflecting means is provided for progressively changing the direction of the stream of fluid flowing through said passage whereby objectionable noise and fluid disturbances are reduced to a minimum.

Other objects and advantages of this invention will be apparent from the following description when taken in conjunction with the accompanying drawings, wherein Fig. 1 is an outside elevational view of my improved shock absorber.

Figure 2:
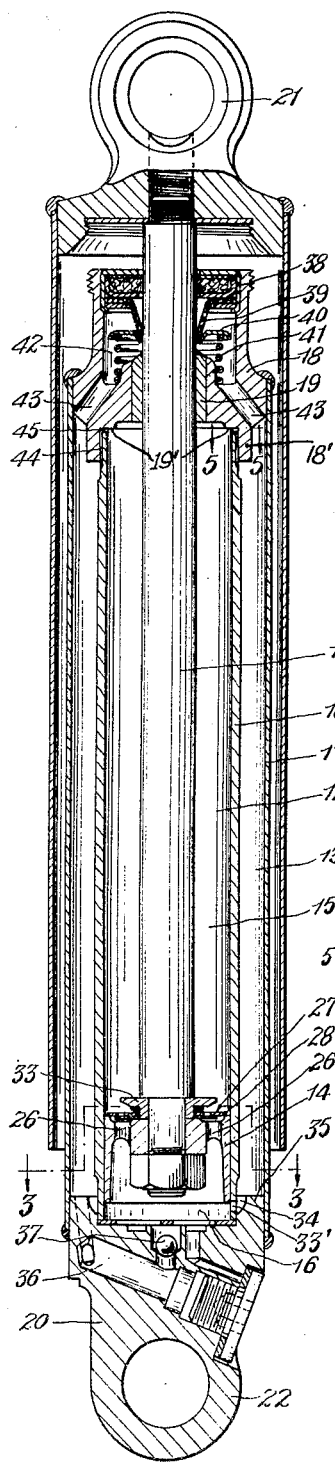
Fig. 2 is a longitudinal sectional view of this shock absorber taken as indicated by line 2—2 of Fig. 1.

Figs. 8 to 10 inclusive are partial longitudinal sectional views showing other embodiments of my novel flow control means, and Figs. 11 to 13 inclusive are transverse sectional views taken, respectively, as indicated by the corresponding section lines on Figs. 8 to 10.

In the accompanying drawings to which detailed reference will now be made, I have illustrated my improved shock absorber, which may be applied to motor vehicles or to various other uses, and which embodies novel flow control means. Although I have illustrated this novel flow control means as being embodied in a shock absorber of the direct acting type, it should be understood however that the invention may be embodied in various other types of shock absorbers.

My improved shock absorber, as illustrated in this instance, is provided with cylinder and reservoir barrels 10 and 11, which are disposed in coaxial relation to provide a working cylinder 12 and a reservoir chamber 13 surrounding the working cylinder. A piston 14 is reciprocable in the cylinder 12 and divides the latter into upper and lower chambers 15 and 16. An actuating shaft or rod 17 extends into the working cylinder 12 and is operatively connected to the piston 14 for reciprocating the latter in the cylinder.

Figure 1:
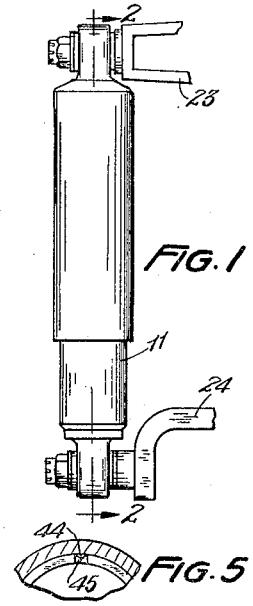

The cylinder and reservoir barrels are closed at their upper end by means of a plug member 18 which is provided with a bearing 19 in which the shaft 17 is slidable. The plug member also has a skirt portion 18' which telescopes the cylinder barrel, and an abutment face 19' which is engaged by the end of the cylinder barrel. The cylinder and reservoir barrels are closed at their lower end by means of the plug member 20. The outer end of the shaft 17 and the plug member 20 may be provided respectively with connecting means, such as the eyes 21 and 22, by means of which the shock absorber may be connected to relatively movable members or vehicle parts 23 and 24, as illustrated in Fig. 1.

The piston 14 is provided with one or more relatively large openings or passages 26 for a transfer of fluid through the piston body as the latter is reciprocated in the working cylinder. For controlling such transfer of fluid through the piston, I provide novel flow controlling means in the form of the valve structure 27. This valve structure comprises a pair of plate members or disks 28 and 29 which are normally in face to face surface contact with each other and which are movably mounted on the piston in check valve relation to the passages 26. The valve element 28 is a substantially rigid plate or disk which is normally biased into engagement with a valve seat 30 provided on the piston, by means of the wavy annular spring 31. This rigid disk is provided with one or more orifices 32 which provide relatively short passages which, in themselves, offer very little frictional resistance to the fluid, and through which the fluid may be forced at a rate which is substantially independent of changes in the viscosity of the fluid. The valve element 29 is preferably a relatively thin flexible plate or disk which overlaps and normally closes the orifices 32 of the rigid valve element. This flexible valve element is disposed between the rigid valve element 28 and the body of the piston and functions as a check valve element for the orifices 32, as will be presently explained.

The body of the piston 14 is preferably formed with an annular groove or recess 32' in the upper end thereof, which connects the piston passages 26 and provides an operating space for the flexible valve element 29. Inwardly of the recess 32' the piston body is provided with a surface or shoulder which is engaged by the flexible valve element while the rigid valve element is against the seat 30. The piston may be provided with an extension part 33 which serves as a guide for the shiftable valve elements and as an abutment for the spring 31.

During downward movement of the piston or, in other words, during the piston stroke produced by a compressing of a vehicle spring, or other cause, some of the fluid in the lower chamber 16 is forced upwardly through the passages 26 of the piston causing the flexible plate 29 to be held in face to face contact with the rigid plate 28 and causing both plates to move upwardly together away from the piston body in opposition to the spring 31. This lifting of the valve elements by the fluid causes the rigid valve plate to separate from the annular seat 30, thereby allowing the fluid to flow upwardly around the outer edge of the rigid plate into the upper chamber 15 of the working cylinder. During the upward stroke of the piston, which, in this case, corresponds with the rebound action of the vehicle spring, the rigid valve plate 28 is seated against the piston body so that fluid can be displaced downwardly through the piston only through the orifices of the rigid plate. The flexible plate 29 normally closes the orifices 32, as stated above, but when the pressure acting on the flexible plate through the orifices increases sufficiently, the flexible plate is sprung away from the rigid plate and a restricted displacement of fluid downwardly into the chamber 16 takes place. This restricted transfer of fluid produces an improved shock absorbing action which will be analyzed more fully hereinafter.

The chamber 16 of the working cylinder is in continuous restricted communication with the reservoir 13 through one or more restricted passages 33' provided at the lower end of the cylinder. This restricted communication between the reservoir and cylinder keeps the working cylinder normally filled with fluid and, in addition, permits a transfer of fluid into or out of the working cylinder to compensate for the displacement of the shaft 17. During the downward stroke of the piston some of the fluid is displaced into the reservoir and the resistance offered to such displacement through the restricted openings 33' produces a shock absorbing action which, with the resistance to the upward flow of the fluid through the piston, produces a shock absorbing action on the compression stroke of the piston, thereby rendering the device double acting.

In some instances, the discharge of fluid into the reservoir through the restricted openings 33' has resulted in an undesirable noise caused by the stream of fluid striking the side wall of the reservoir 11 or by an excessive disturbance being created in the fluid. To eliminate this undesirable action, I have provided for a progressive change in the direction of the stream flowing through each opening 33' whereby this stream is directed into the body of fluid in the reservoir in a direction such that it does not contact directly with the side wall of the reservoir. I accomplish this result by providing a deflecting surface 34 adjacent the restricted openings 33' and, if desired, this deflecting surface may be arranged as shown in Fig. 2 of the drawings. In this arrangement the closure plug 20 is provided with an annular flange or projection 35, which extends between the cylinder and reservoir barrels. This projection is cut out adjacent the restricted openings 33' to provide the arcuate annular surface 34 against which the streams of fluid impinge. The curvature of this surface progressively changes the direction of flow of the stream so that the latter cannot strike the side wall of the reservoir but is directed upwardly into the body of fluid. The annular flange 35 may be made relatively thick and rigid so that noise producing vibrations will not be set up in this part by the fluid striking the deflecting surface 34.

To facilitate the return of fluid into the working cylinder from the reservoir during the upward stroke of the piston, the plug member 20 may be provided with a passage 36, which bypasses the openings 33' and which is controlled by a check valve 37.

Loss of fluid, due to leakage around the shaft 17, may be prevented by providing a sealing structure 38 having a packing 39 for scraping the fluid from the shaft 17. The inner end of the packing 39 is normally pressed against the shaft by means of the washer 40 which is biased toward the packing by a spring 41. Fluid scraped from the shaft by the packing is collected in the chamber 42 and thence drained into the reservoir through the passages 43.

Figure 5:
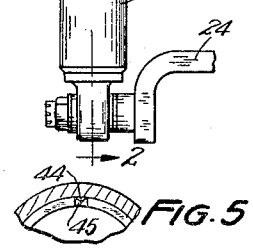
Fig. 5 is a partial sectional view taken as indicated by line 5—5 of Fig. 2 and showing the air eliminating means.
Figure 3:
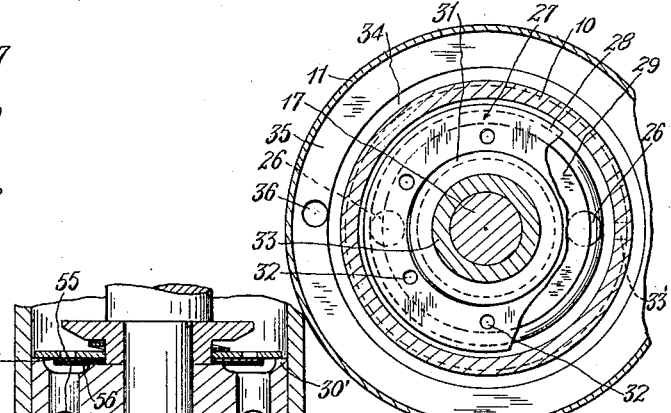
Fig. 3 is a transverse sectional view taken substantially on line 3—3 of Fig. 2.

To eliminate air from the working cylinder, I provide one or more restricted passages connecting the upper end of the working cylinder with the upper end of the reservoir. These passages may be formed as shown in Figs. 2 and 5, by providing grooves 44 in the outer surface of the cylinder barrel, and by providing notches 45 in the end of the cylinder barrel in registration with the grooves. The passages provided by these grooves and notches are of such small cross-sectional area that the friction of the liquid therein prevents any substantial volume of liquid from being transferred therethrough. These passages do not offer such a high resistance to a flow of air therethrough and hence do permit a transfer of air from the working cylinder into the reservoir with the result that the tendency to create an emulsion is greatly reduced.

Figure 6:
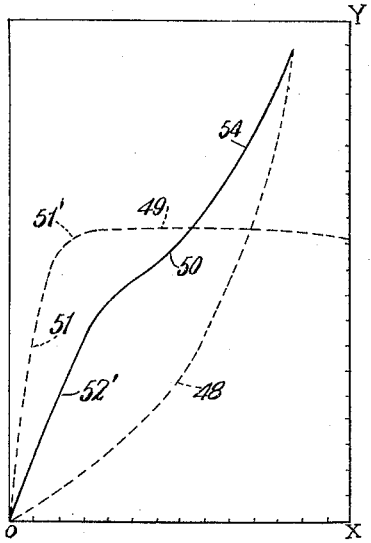
Fig. 6 is a graphic illustration of the improved action obtained by the use of my novel flow control means.

Reverting now to the valve structure described above for controlling the flow of fluid through the passages 26 of the piston, I shall explain further the beneficial action produced by this valve structure, by referring to the graphic illustration shown in Fig. 6. In this illustration the reference line ox represents the velocity of piston travel in inches per second and the reference line xy represents the resistance to movement, in pounds, offered by the piston. The curve 48 represents a characteristic shock absorbing action which has heretofore been obtained in shock absorbing devices, and the curve 49 is a curve representing the characteristic action of a pop-off valve. The curve 50 represents the shock absorbing action obtained from a shock absorber embodying my novel flow control means.

In accordance with present day automotive practice the springs for motor vehicles are so constructed and mounted that there is very little frictional resistance between the leaves of the spring and at the connecting shackles. This reduction, in the friction heretofore encountered in vehicle springs and their connections, has reduced the resistance heretofore offered to deflection of the springs, during both the compression and the rebound action, when the vehicle passes over rough roads. When a shock absorber having the operating characteristics represented by the curve 48 is applied to a vehicle wherein the spring and shackle friction has been reduced as explained above, the shock absorber does not sufficiently compensate for the friction which has been eliminated and the riding quality of the vehicle is impaired by an undesirable bouncing action, occurring at relatively low car speeds and on roads which are only moderately rough. If the shock absorber is constructed to function with the characteristics of a pop-off valve as represented by the curve 49, the initial resistance offered by the shock absorber is too great and the vehicle then rides too hard for satisfactory comfort at relatively low car speeds. In the case of the shock absorber having the action illustrated by the curve 48, the pressure of the fluid in the shock absorber increases too slowly as is shown by the slope of this curve. In the case of a shock absorber having the characteristic action represented by the curve 49, the pressure of the fluid in the shock absorber builds up too suddenly, as is shown by the slope of the portion 51 of this curve and, after having built up to the point of causing the valve to open, which is represented by the portion 51' of this curve, a further gradual increase in the pressure of the fluid, which is desirable in shock absorbers, is not obtained and insufficient control is provided at high car speeds or on very rough roads.

In the action of my improved flow control means, as represented by the curve 50, the fluid pressure and the spring initially acting on the rigid plate 28 press the latter against the seat 30 and also press the flexible plate 29 against the shoulder 52. This action on the flexible plate causes the same to be held against the rigid plate 28, in overlapping relation to the orifices 32, initially preventing a flow of fluid downwardly through these orifices with the result that the pressure of the fluid builds up rapidly in relation to the velocity of the piston. When the pressure of the fluid acting on the plate 29 through the orifices, increases to a value great enough to overcome the force tending to hold the flexible plate against the rigid plate, as represented by the section 52' of the curve, the portion of the flexible plate which overhangs the edge 53 of the shoulder 52 is sprung away from the rigid plate and a larger area of the flexible plate is then acted upon by the fluid. This increase, in the area of plate surface which is acted upon by the fluid, causes the flexible plate to be sprung further away from the rigid plate, and to be so held, while a restricted flow of fluid takes place downwardly through the orifices. This restricted flow, which takes place while the flexible plate is held away from the rigid plate, is controlled by the orifices themselves and, because of the characteristics of these orifices, the flow of fluid therethrough takes place at a rate which is substantially independent of changes in the viscosity of the fluid. The resistance to flow offered by the orifices may be varied by changing their cross-sectional area and this area is usually so selected that the pressure of the fluid in the shock absorber continues to gradually build up, as represented by the portion 54 of the curve. Thus by reason of the control functions exercised by the valve element 29 and the orifices 32, a shock absorbing action is produced which, in relation to piston speed, is satisfactory for the desired riding qualities of the vehicle.

Figure 7:
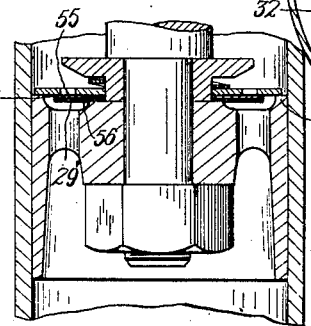
Fig. 7 is a partial sectional elevation illustrating another form of my improved flow control means.

In Fig. 7 of the drawings, I have illustrated a further improvement in the flow control means of my shock absorber, wherein the flexible valve element 29' is constructed of such material, or of such form, that it is responsive to temperature changes so that the functioning of this element will be automatically changed to an extent desired for the purpose of compensating for undesirable tendencies of the fluid resulting from changes in the viscosity thereof. In obtaining this result, I construct the flexible member 29' of laminations or metal sheets 55 and 56. The sheet 55 is formed of a metal having a low coefficient of expansion and the sheet 56 is formed of metal having a high coefficient of expansion. When the temperature of the working fluid increases, the unequal expansion of the sheets creates a tendency for the valve plate to be buckled or deflected, thereby causing the outer edge 57 of the valve plate to be pressed more firmly against the rigid plate. The increase in the temperature of the fluid also causes the viscosity of the fluid to be decreased, with the resulting tendency for a larger percentage of the fluid to leak past the piston 30' during the operation of the device. The increase in the force with which the flexible plate is pressed against the rigid plate, due to the flexing of the flexible plate in response to the increase in temperature, causes the flexible plate to offer greater resistance to flow through the orifices thus creating a tendency to increase the pressure of the fluid and thereby compensating for the increase in the fluid leakage consequent to the decrease in the viscosity of the fluid. If the temperature of the fluid decreases, its viscosity increases and less leakage takes place around the piston. Such decrease in temperature also tends to cause a flexing of the flexible plate away from the rigid plate, which is opposite to the flexing described above for a temperature increase. This tendency for the flexible plate to be moved away from the rigid plate reduces the resistance which the flexable plate offers to flow through the orifices and thus compensates for the increase in the viscosity of the liquid.

Figure 4:
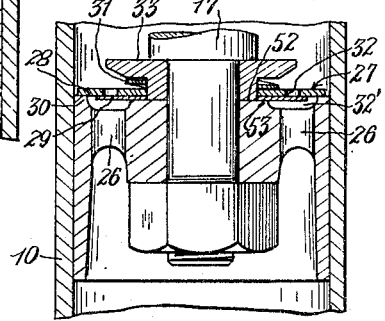
Fig. 4 is a partial sectional view, on an enlarged scale, illustrating the improved flow control means.

In Figs. 8, 9 and 10 of the drawings I have illustrated other forms of my novel flow control means which may be embodied in a shock absorber of the type illustrated in Fig. 2, or in various other types of shock absorbers, and from which I obtain substantially the same desirable operating characteristics as are obtained from the flow control means illustrated in Figs. 2 and 4 and as are represented graphically by the curve 50 in Fig. 6.

In the embodiment illustrated in Fig. 8, a piston 60 is reciprocably slidable in a cylinder 61 and is adapted to be actuated by a piston rod or shaft 62 to which the piston is connected. The piston is provided with orifices 63 and 64, which are controlled, respectively, by ball type check valve elements 65 and 66, for a transfer of fluid from one side of the piston to the other. The check valve element 65 is normally held in seated position to close the orifice 63 by means of a spring 67. This spring may be of any suitable form but is here shown as being a curved plate having fluid openings 68 therethrough and as being retained in operating relation to the valve element by means of the screw plug 69. This plug is also provided with an opening 70 which forms a part of the fluid passage through the piston. The check valve element 66 is normally retained in seated position to close the orifice 64 by means of a spring 71 and a plug 72, this spring and plug being similar to the spring 67 and plug 69 just described for the valve element 65.

During operation of a shock absorber embodying the flow control means illustrated in Fig. 8, a downward movement or compression stroke of the piston causes fluid pressure to act against the valve element 66 through the orifice 64. When the pressure of this fluid becomes sufficient to unseat the valve element 66 fluid flows upwardly through the orifice 64 and through the plug 72 to the upper side of the piston. During this compression stroke the valve element 65 remains seated against the inner end of the orifice 63. During the upward or rebound stroke of the piston the valve element 66 is seated against the inner end of the orifice 64 and fluid pressure acts against the valve element 65 through the orifice 63. When the pressure of the fluid acting on the valve element 65 builds up sufficiently to overcome the spring 67 the valve element is unseated and a transfer of fluid takes place downwardly through the orifice 63, through the opening 68 of the spring plate and through the opening 70 of the plug 69. While the valve element 65 is held unseated by the fluid, the orifice 63 exercises a control function on the flow of fluid, similar to that explained above in connection with Figs. 2 and 4.

In the flow control means illustrated in Fig. 9 a piston 75 is operably connected to a piston rod 76 for reciprocation in the cylinder 77. The piston rod is provided at its inner end with a guide portion or stem 78 which extends between shoulders 79 and 80 on the rod. The piston 75 may be clamped on the piston rod against the shoulder 80 and immediately below the guide stem portion, by means of the nut 81.

The piston is provided with one or more relatively large passages 82 therethrough which are connected together by means of a channel or recess 83 formed in the upper end of the piston. For controlling the flow of fluid through the piston during movement of the latter, I provide a control valve assembly 84 comprising relatively movable cooperating valve elements 85 and 86. The valve element 85 is a substantially rigid member which is adapted to seat against the annular portion 87 of the piston. This valve element is provided with an annular chamber 88 in the under side thereof and with a plurality of orifices 89 extending through the member and communicating with this chamber. The valve element 86 has a sleeve portion 90 which is slidable on the guide stem 78 of the piston rod and has a plate portion 91 disposed between the piston and the valve element 85 and overlying the annular chamber 88 of the latter.

As shown in Fig. 9 of the drawings the sleeve portion 90 of the valve element 86 is disposed around a guide stem portion 78 of the piston rod and the valve element 85 is, in turn, disposed around the sleeve portion of the valve element 86. A wavy spring washer 92 is disposed around the sleeve portion 90 between the flange 93 at the upper end of this sleeve portion and a flange portion 94 of the valve member 85. This spring normally tends to hold the plate portion 91 of the valve element 86 against the under side of the valve element 85.

During the downward or compression stroke of the piston 75 fluid passes upwardly through the openings 82 and, acting against the valve structure, causes both valve elements to shift upwardly substantially as a unit along the guide stem portion 78 of the piston rod. This movement causes the valve element 85 to be unseated from the annular portion 87 of the piston and fluid passes upwardly from the recess 83 around the outer edge of the valve element 85 into the chamber of the cylinder above the piston. The extent of movement of the valve element 85 away from the body of the piston depends upon the extent to which the spring 92 is deflected by the fluid pressure acting against the valve element after the flange portion 93 has engaged the shoulder 79 of the piston rod. On the upward or rebound stroke of the piston the valve element 85 is seated against the piston and fluid is forced downwardly through the orifices 89 into the chamber 88 where the fluid acts against the plate portion 91 of the valve element 86. The spring 92 initially prevents opening of the valve element 86, but when the pressure of the fluid increases sufficiently this valve element is moved downwardly relative to the valve element 85 causing the plate portion 91 to uncover the chamber 88, thereby allowing fluid to flow downwardly through the piston passages 82. During this downward flow the valve element 86 is held away from the valve element 85 and the orifices 89 control the flow to produce the desired shock absorbing action.

The arrangement illustrated in Fig. 10 is generally similar in principle and operation to that just described in connection with Fig. 9. In this form of the invention, as shown in the drawings, a piston 95 is reciprocable in a cylinder 96 and is connected to a piston rod or shaft 97. The piston is provided with one or more relatively large fluid passages 98 which are connected at their upper end by a recess or chamber 99 formed in the piston. An annular valve seat 100 is formed on the piston to extend around the chamber 99.

For controlling the flow of fluid through the piston during movement of the latter, I provide a valve structure comprising relatively movable valve elements 101 and 102. The valve element 101 is a substantially rigid cup-shaped member, the skirt portion 101' of which is normally held against the valve seat 100 by the wavy spring washer 103. The valve element 101 may be mounted on a sleeve 104 which is slidable on a guide stem portion 105 of the piston rod. The valve element 101 is provided with one or more orifices 106 which extend through this element and communicate with the chamber 107 formed in the under side of this element. The valve element 102 may also be mounted on the sleeve 104 and preferably comprises a flexible metal plate which is normally biased against the valve element 101 so as to overlie and close the chamber 107 therein.

During the compression or downward stroke of the piston, fluid passes upwardly through the openings 98 of the piston and causes the valve elements 101 and 102 to be shifted substantially as a unit against the action of the spring 103, thereby causing the valve element 101 to be unseated from the portion 100 of the piston, and allowing fluid to flow upwardly through the piston and around the valve structure into the upper portion of the cylinder. During the upward or rebound stroke of the piston the valve element 101 is held against the seat 100 by the spring 103 and by fluid pressure, and fluid is forced downwardly through the orifices 106 into the chamber 107. The valve element 102 initially prevents the fluid from flowing downwardly out of the chamber 107, but when the pressure of the fluid increases sufficiently to deflect the valve element 102 away from the valve element 101 a flow of fluid takes place downwardly through the passages 98 of the piston. Such flow taking place while the valve element 102 is held open, is regulated by the action of the orifices 106.

From the foregoing description and the accompanying drawings, it will now be readily seen that I have provided an improved shock absorber embodying novel fluid-flow control means, and wherein the flow of fluid is controlled so that the pressure of the fluid in the shock absorber builds up at the desired rate in relation to the velocity of the piston to produce the most satisfactory riding qualities when the device is applied to a vehicle. Moreover, it will be seen that I have provided novel means for preventing undesirable noises and fluid disturbances during the transfer of fluid under pressure from one chamber to another of the shock absorber.

While I have illustrated and described the apparatus of my invention in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. In a shock absorber of the fluid displacement type the combination of a member having a relatively short orifice through which fluid may be displaced, and a metallic valve controlling said orifice, said valve and orifice being such as to retard the displacement of fluid to cause a relatively rapid initial increase and a controlled subsequent increase in the pressure of the fluid, said valve being movable relative to said member and being normally biased against said member to close the orifice but adapted to be moved to open the orifice by fluid acting thereagainst through the orifice.

2. In a shock absorber of the fluid displacement type the combination of a substantially rigid member having a relatively short orifice through which fluid may be displaced, and a valve controlling said orifice, said orifice and valve being such as to retard the displacement of fluid to cause a relatively rapid initial increase and a controlled subsequent increase in the pressure of the fluid, said valve comprising a relatively thin flexible metal plate normally biased into contact with said rigid member to control said orifice and adapted to be flexed away from the rigid member by fluid acting thereagainst through the orifice.

3. In a shock absorber of the fluid displacement type the combination of a member having an opening through which fluid is adapted to be forced, and a valve structure controlling the flow through said opening and comprising a plurality of cooperating metallic disk elements adapted to shift together substantially as a unit relative to said member to provide a control valve which is adapted to be opened by a flow of fluid in one direction through said opening, one of said elements being provided with an orifice and another being arranged to form a valve for said orifice which is adapted to be opened by the pressure of the fluid acting through the orifice while said one valve element is in its closed position.

4. In a shock absorber the combination of a housing having a plurality of chambers therein, liquid in said chambers, a passage for the transfer of liquid from one chamber to the other, means for alternatively subjecting the liquid in said chambers to pressure to cause such transfer, and a flow control valve for said passage comprising a plurality of cooperating metallic disk valve elements, one element having an orifice therein and another element being shiftable relative to said one element to control said orifice, and means supporting said elements whereby the same are shiftable together substantially as a unit by a flow of liquid in one direction through said passage and whereby said other element is adapted to be moved away from said one element by a flow of liquid in the opposite direction.

5. In a shock absorber of the fluid displacement type a flow control valve comprising a plurality of metallic disk valve elements in engagement with each other, one element being substantially rigid and having an opening therethrough and another element having a relatively thin and flexible portion overlapping a portion of the rigid element and normally closing said opening, and means supporting said elements whereby the same are shiftable substantially as a unit by a flow of fluid in one direction and whereby the overlapping portion of said other element is adapted to be moved away from said rigid element by a flow of fluid in the opposite direction.

6. In a shock absorber of the fluid displacement type the combination of a part having a passage through which fluid is adapted to be forced and also having a valve seat thereon, a substantially rigid valve element having an orifice therein, a spring normally biasing said rigid element against said seat, and a flexible valve element between said rigid element and said part and normally engaging the rigid element to control said orifice, said valve elements being metallic disks and being shiftable together substantially as a unit away from said part by a flow of fluid in one direction through said passage and said flexible element being movable away from the rigid element while the latter is in engagement with said seat by the fluid acting in the opposite direction through said orifice.

7. In a shock absorber of the fluid displacement type the combination of a part having an opening through which fluid is adapted to be forced and also having a valve seat thereon, a valve structure movable relative to said part and adapted to control the flow of fluid through said opening, said structure comprising a plurality of metallic substantially flat valve disks in face to face surface contact with each other, one disk being substantially rigid and having an opening therethrough and another disk being flexible and arranged to overlap the opening of the rigid disk, and a spring normally biasing the rigid disk toward said seat, said disks being movable away from said part substantially as a unit and the flexible disk being adapted to be sprung away from the rigid disk by the fluid acting through said opening whereby the flow through said opening is retarded.

8. In a fluid type shock absorber the combination of a member having an opening through which fluid may be forced and also having a seat around said opening, a valve element provided with an orifice and adapted to engage said seat, a second valve element adapted to seat against the first mentioned valve element to control said orifice, said valve elements being shiftable substantially as a unit and away from said seat by a flow of fluid in one direction and said second valve element being shiftable away from said first mentioned valve element by fluid acting through said orifice while the first mentioned valve element is in engagement with said seat, means adapted to be engaged by said second valve element for limiting the unitary shifting movement of said elements, and a spring acting on said elements and normally biasing the second valve element into seating engagement with said first mentioned valve element.

9. In a shock absorber of the fluid displacement type the combination of a substantially rigid member having an orifice through which fluid is adapted to be forced, and a valve controlling said orifice, said valve and said orifice being such as to retard the displacement of fluid to cause a relatively rapid initial increase and slower subsequent increase in the pressure of the fluid, said valve comprising a flexible part normally biased into contact with said rigid member to control said orifice and adapted to be flexed away from the rigid member by fluid acting thereagainst through the orifice, said flexible part comprising sections formed respectively of metals having different coefficients of expansion whereby the resistance which the flexible part offers to fluid flow through the orifice varies in response to temperature changes.

10. In a shock absorber of the fluid displacement type the combination of a part having a passage through which fluid is adapted to be forced and also having a valve seat thereon, a substantially rigid valve element having an orifice therein, a spring normally biasing said rigid element against said seat, and a flexible valve element between said rigid element and said part and normally engaging said rigid element to control said orifice, said valve plates being shiftable together substantially as a unit away from said part by a flow of fluid in one direction through said passage and said flexible element being movable away from the rigid element while the latter is in engagement with said seat by the fluid acting in the opposite direction and through said orifice, said flexible element being a laminated plate of bimetallic construction and adapted to be deflected in response to temperature changes.

11. In a shock absorber of the fluid-flow type the combination of a plurality of tubular members arranged to provide a working cylinder and a reservoir around said cylinder, a passage extending laterally through the wall of the cylinder and connecting the latter with said reservoir, a plug arranged to close said tubular members at one end thereof and having a substantially rigid part extending into the reservoir into proximity with said passage, said part having a curved surface thereon for changing the direction of the stream flowing through said passage and directing such stream into the body of fluid in the reservoir.

JOSEPH E. PADGETT.